Aug. 16, 1955     C. H. MUELLER ET AL     2,715,454
LUBRICATING SYSTEM
Filed Aug. 30, 1954     4 Sheets-Sheet 1

Carl H. Mueller,
Lutwin C. Rotter,
Rudy F. Schneller,
Inventors.
Koenig and Pope,
Attorneys.

Aug. 16, 1955     C. H. MUELLER ET AL     2,715,454
LUBRICATING SYSTEM
Filed Aug. 30, 1954     4 Sheets-Sheet 2
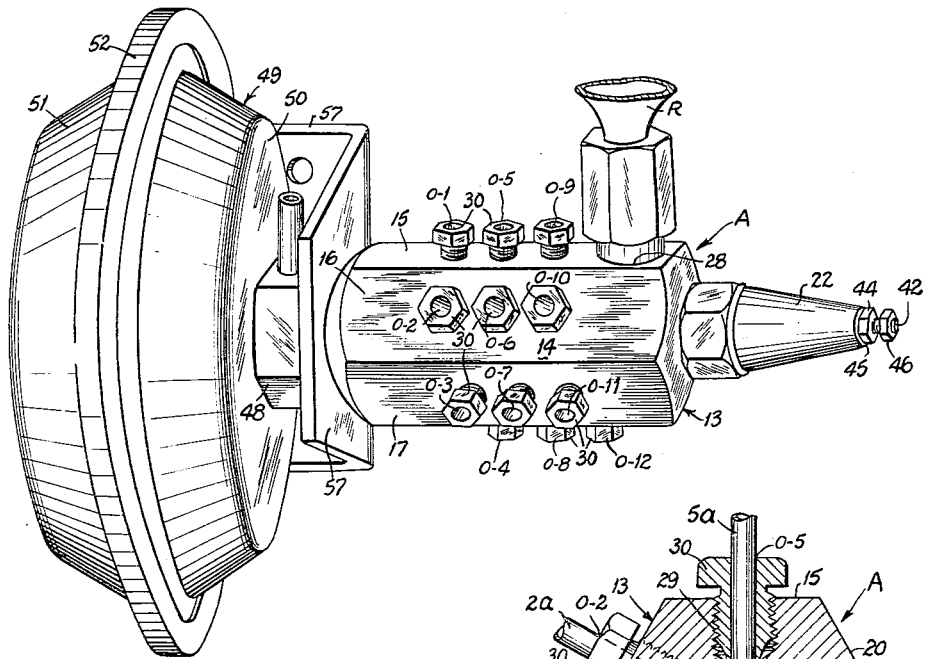
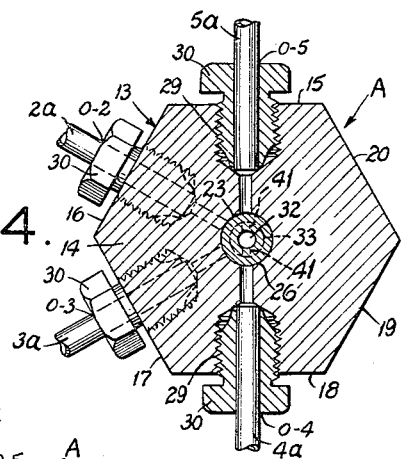
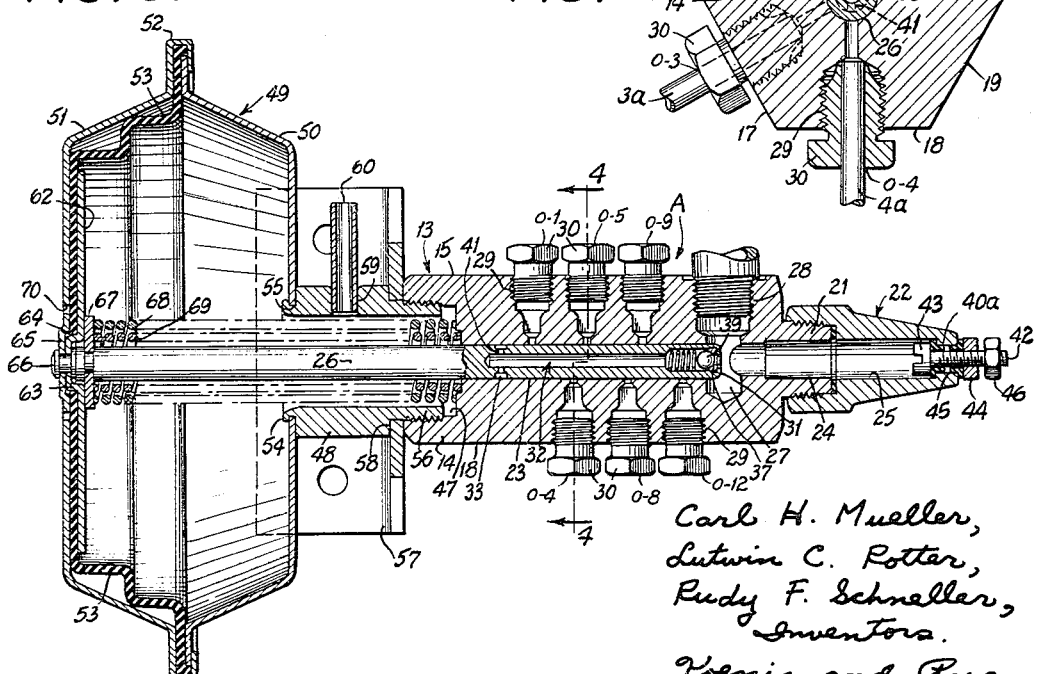

Aug. 16, 1955 — C. H. MUELLER ET AL — 2,715,454
LUBRICATING SYSTEM
Filed Aug. 30, 1954 — 4 Sheets-Sheet 3
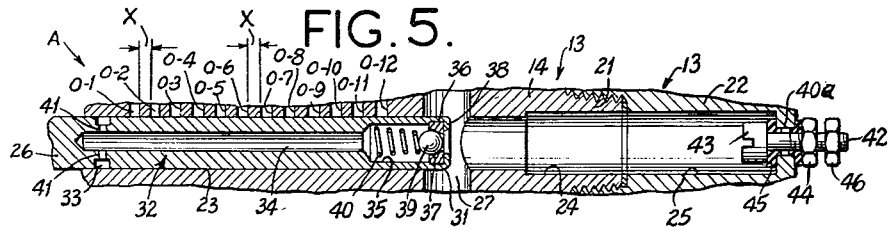
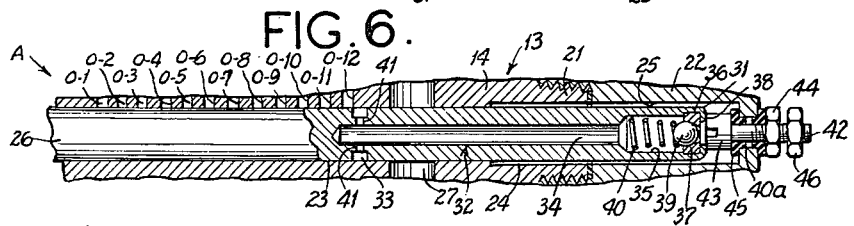
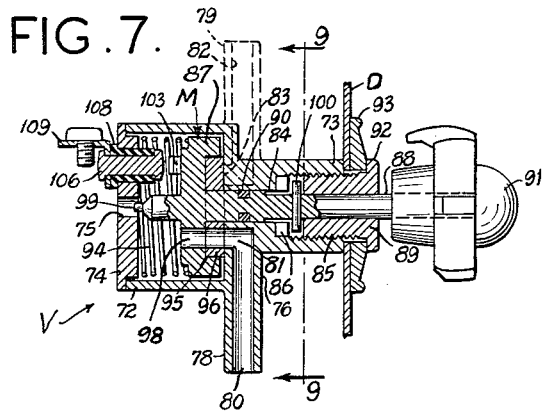
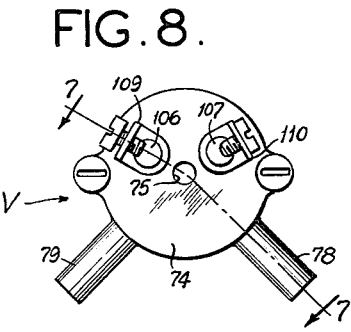
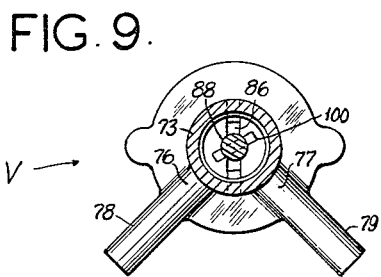
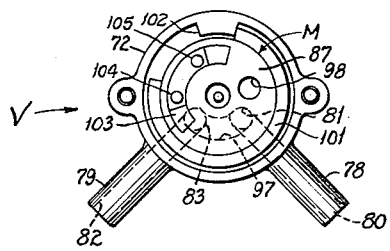
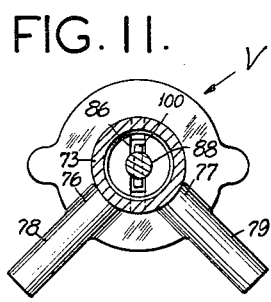
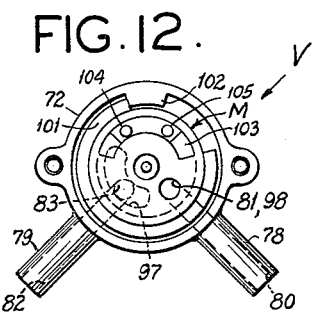
Carl H. Mueller,
Lutwin C. Rotter,
Rudy F. Schneller,
Inventors.
Koenig and Pope,
Attorneys.

Aug. 16, 1955     C. H. MUELLER ET AL     2,715,454
LUBRICATING SYSTEM
Filed Aug. 30, 1954     4 Sheets-Sheet 4
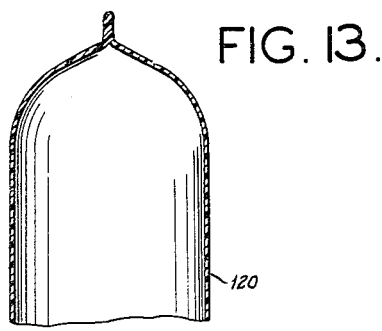
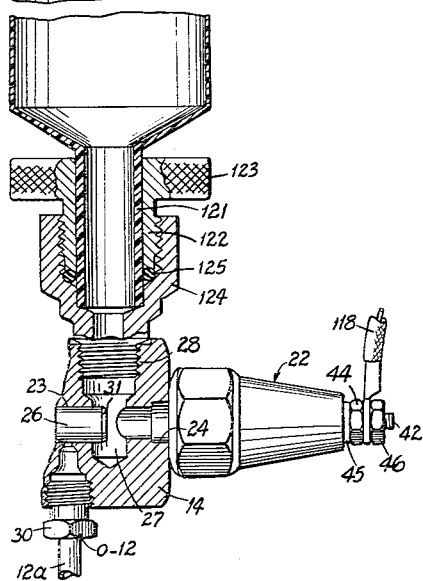

United States Patent Office 2,715,454
Patented Aug. 16, 1955

2,715,454

LUBRICATING SYSTEM

Carl H. Mueller, Pasadena Hills, Lutwin C. Rotter, Maplewood, and Rudy F. Schneller, O'Fallon, Mo., assignors to Lincoln Engineering Company, St. Louis, Mo., a corporation of Missouri Application August 30, 1954, Serial No. 452,828

16 Claims. (Cl. 184—7)

This invention relates to lubricating systems, and more particularly to a lubricating system for automotive vehicles.

Among the several objects of the invention may be noted the provision of an improved lubricating system for an automotive vehicle which is carried by the vehicle and adapted properly to lubricate various points of lubrication of the vehicle; the provision of a system of this class which includes means whereby lubrication may be effected either automatically in response to the starting and stopping of the engine of the vehicle, or manually effected at will, the provision for manual operation being useful to take care of lubrication during a prolonged period of engine operation or to avoid unduly frequent lubrication if conditions require frequent starting and stopping of the engine; the provision of a system of the class described which utilizes vacuum derived from the intake manifold of the vehicle for its operation; the provision of a system of this class which includes means adapted upon manual operation to provide a visual indication to the driver of the vehicle that delivery of lubricant has been completed; and the provision of a system of this class which is economical to install on a vehicle and reliable in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a semi-diagrammatic perspective, with parts broken away, showing a lubrication system of this invention as installed on an automotive vehicle, and illustrating one type of lubricant reservoir that may be used in the system;

Fig. 2 is a perspective of a vacuum-motor-operated injector used in the system;

Fig. 3 is a longitudinal cross section of Fig. 2;

Fig. 4 is an enlarged transverse cross section taken on line 4—4 of Fig. 3;

Fig. 5 is an enlarged fragment of Fig. 3, semi-diagrammatic to the extent of illustrating the outlet ports of the injector in a common plane rather than angularly offset;

Fig. 6 is a view similar to Fig. 5 showing a moved position of parts;

Fig. 7 is a longitudinal cross section of a control valve used in the system taken on line 7—7 of Fig. 8, showing by means of dotted lines a part of the valve projected into the plane of the drawing, and illustrating parts in so-called "manual position";

Fig. 8 is an end view of the control valve as viewed from the left of Fig. 7;

Fig. 9 is a transverse cross section taken on line 9—9 of Fig. 7, illustrating parts in so-called "automatic position";

Fig. 10 is an end view of Fig. 7 as viewed from the left with a cover of the valve removed and showing parts in the automatic position;

Fig. 11 is a view similar to Fig. 9 showing parts in the manual position;

Fig. 12 is a view similar to Fig. 10 showing parts in the maual position;

Fig. 13 is a cross-sectional view illustrating another type of lubricant reservoir that may be used in the system;

Fig. 14 is a view in elevation of another type of reservoir that may be used in the system, showing the reservoir prior to its connection to the injector of the system; and, Fig. 15 is a cross-sectional view showing how the reservoir of Fig. 14 is connected to the injector.

Corresponding reference characters indicate corresponding parts throughout the several views of the drawings.

Figure 1:
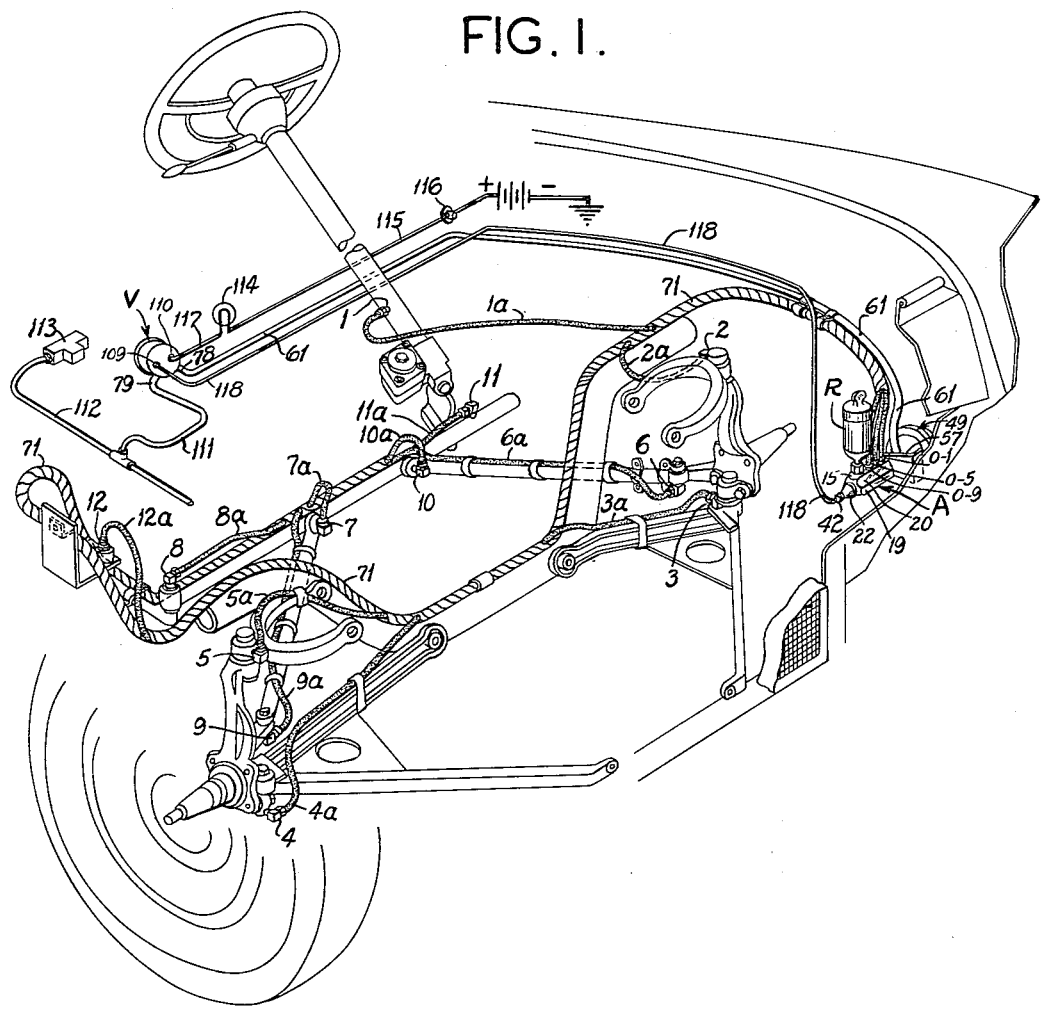

Referring to the drawings, Fig. 1 illustrates the installation of a lubricating system of this invention on a present-day class of automotive vehicle which has a ball joint front wheel suspension, for lubricating various points of the suspension and the steering linkage of the vehicle. As shown, the points of lubrication are the selector arm 1, the upper ball joint 2 for the left wheel, the lower ball joint 3 for the left wheel, the lower ball joint 4 for the right wheel, the upper ball joint 5 for the right wheel, the left outer tie rod end 6, the right inner tie rod end 7, the right drag link 8, the right outer tie rod end 9, the left inner tie rod end 10, the left drag link 11, and the stationary idler arm 12. Thus, there are twelve points of lubrication in all.

The system includes a twelve-outlet lubricant injector A with twelve lubricant delivery lines 1a to 12a leading from the injector outlets to the stated twelve points of lubrication 1 to 12. The injector A, shown in detail in Figs. 2–6, comprises a cylinder generally designated by the reference character 13. This cylinder 13 comprises an elongate cylinder block 14 made of suitable metal and of hexagonal cross section, thereby having six sides designated 15, 16, 17, 18, 19 and 20 (see Figs. 2 and 4). The block is electrically conductive and has an integral cylindrical extension 21 at one end constituting its forward end. Threaded on this extension 21 is a head 22. The block 14 has a central longitudinal bore 23 which is slightly enlarged at the forward end of the block and in the extension as indicated at 24. The head 22 has a bore 25 in extension of the bore in the block. A plunger 26 made of suitable metal is movable in the cylinder 13 toward and away from its forward end (its right end as viewed in Figs. 2 and 3). The plunger is dimensioned to have a sliding sealing fit in the bore 23. It is electrically conductive and is in electrically conductive relation with respect to the block 14.

The block 14 has a lateral inlet port 27 and a series of twelve longitudinally spaced lateral outlet ports designated by the reference characters 0–1 to 0–12. The inlet port 27 is located adjacent the forward end of the block leading into the bore 23, and the outlet ports are located between the other end of the block (its rearward end) and the inlet port. The inlet port is located in the side 15 of the block. The outlet ports are successively angularly offset, ports 0–1, 0–5 and 0–9 being aligned in a row along the side 15 of the block, ports 0–2, 0–6 and 0–10 being aligned in a row along the side 16, ports 0–3, 0–7 and 0–11 being aligned in a row along the side 17, and ports 0–4, 0–8 and 0–12 being aligned in a row along the side 18. Sides 19 and 20 are completely closed. The inlet port at its outer end is formed as a threaded socket 28 for receiving a coupling at the lower end of a lubricant reservoir R, such as a glass bowl (see Fig. 1). Each outlet port at its outer end is formed as an enlarged threaded socket 29 for receiving a compression nut 30 for connection thereto of a respective lubricant delivery line 1a to 12a. Each delivery line may consist of a flexible plastic tube, for example.

The forward or working end of the plunger toward the forward or head end of the cylinder 13 is designated 31. The plunger is made hollow for some distance from its working end 31 to provide a longitudinal passage generally designated 32 for communication from the space in the cylinder 13 ahead of the plunger to a lateral port 33 in the plunger spaced from its working end. The passage 32 is provided by forming a bore 34 in the plunger, with counterbores 35 and 36 toward the working end of the plunger. Counterbore 35 constitutes a valve chamber. A check valve seat member 37 is located in counterbore 36, being held against the shoulder at the inner end of 36 by peening over the end of the plunger as indicated at 38. A valve ball 39 is provided in chamber 35 adapted to engage the seat 37. The ball 39 is biased toward the seat by a compression spring 40 in chamber 35.

The lateral port 33 in the plunger is formed as an annular peripheral groove with radial openings 41 from the passage 32 to the groove. The intervals between the outlet ports 0–1 to 0–12 are made equal to the width of the port or groove 33. By "interval" is meant the distance in longitudinal direction from the trailing point of the trailing edge of any outlet port (its right edge nearest the right end of the cylinder) to the leading point of the leading edge (the left edge) of the next successive port. These intervals are indicated at X in Fig. 5, each being equal to the width of the port or groove 33. The distance from the working end of the plunger 26 to the right edge of the groove 33 is made equal to the distance from the right edge of the inlet port 27 to the left edge of the first outlet port 0–1 so that when the plunger is moved forward from the retracted charging position shown in Fig. 3 wherein it unblocks the inlet port 27, the groove 33 comes into communication with the first outlet port 0–1 as the plunger reaches the position where it blocks off the inlet port. When the plunger is in its retracted position, lubricant may flow through the inlet port into the space in cylinder 13 ahead of the plunger to charge the injector. The groove 33 is then located to the left of the first outlet port 0–1 and is blocked.

The head 22 has an opening 40a in its outer end smaller than bore 25. An electrically conductive bolt 42 is received in the opening 40a with the bolt head 43 in the bore 25 and the shank of the bolt extending out of the head 22. A nut 44 holds the bolt in place. The bolt is electrically insulated from the head 22 by insulation as indicated at 45. A second nut 46 is threaded on the shank of the bolt outward of the nut 44 for wire-clamping purposes as will appear.

The rearward end of the cylinder 13 (its left end as viewed in Fig. 3) is counterbored as indicated at 47. Threaded in the counterbore 47 is a tubular fitting 48 for attachment to the cylinder of a diaphragm-type vacuum motor generally designated 49. The motor comprises two cups 50 and 51 secured together at their rims as indicated at 52, with a diaphragm 53 having its margin clamped between the rims. The fitting 48 is riveted as indicated at 54 in a central opening 55 in the base of cup 50. It has a reduced-diameter end extension 56 threaded in the counterbore 47. An electrically conductive mounting bracket 57 is clamped between the shoulder 58 at the inner end of extension 56 and the rearward end of the cylinder 13 in conductive relation with respect to the cylinder. The fitting 48 has a lateral port 59 in which is provided a nipple 60 for connection of a vacuum line 61. The plunger 26 extends rearward out of the cylinder 13 and through the fitting 48 into the motor 49 for engagement of its rearward end by the diaphragm.

The diaphragm has a sheet metal plate 62 on the side toward the plunger with a central cup-shaped portion 63 received in a central opening 64 in the diaphragm. On the other side of the diaphragm is a cup-shaped sheet metal member 65, with a rivet 66 holding plate 62 and part 65 together and clamping the diaphragm therebetween. The rearward end of the plunger engages the rivet 66. A collar 67 is provided on the plunger adjacent its rearward end. A pair of coil compression springs 68 and 69 react from the inner end of counterbore 47 against the collar 67 to bias the plunger and the diaphragm rearward to the retracted charging position illustrated in Fig. 3, determined by engagement of the diaphragm with the base of the cup 51, and wherein member 65 is accommodated in a central opening 70 in the base of cup 51. Opening 70 provides for atmospheric pressure on the left side of the diaphragm. In the retracted position of the plunger, its forward end is so positioned that the inlet port 27 is unblocked for flow of lubricant from the reservoir R into the space in cylinder 13 ahead of the plunger. Upon evacuation of the motor chamber on the right side of the diaphragm via port 59, atmospheric pressure on the left side of the diaphragm drives the diaphragm and the plunger to the right against the return bias of springs 68 and 69. Forward movement of the plunger is limited by engagement of its forward end with the head 43 of bolt 42.

Referring to Fig. 1, the mounting bracket 57 is shown as attached to the vehicle with the reservoir R upright. This attachment may be made at any convenient location where the bracket will be electrically grounded. The twelve outlet lines 1a to 12a leading from the outlet ports of the injector are assembled in a harness 71 for ease in installation, and the respective lines lead out of the harness at various places to the respective points of lubrication 1 to 12. The vacuum line 61 connected to the nipple 60 has its other end connected to a control valve V which may be mounted on the dashboard of the vehicle.

The valve V is shown in detail in Figs. 7–12. It comprises a valve body 72 in the form of a cup with a cylindrical extension 73 from the base of the cup. The open side of the cup 72 is closed by a cover 74 having a central opening or port 75. The base of the cup is formed on the outside with integral radial bosses 76 and 77 and with integral nipples 78 and 79 in radial extension of the bosses. Nipple 78 and boss 76 have a bore 80 providing a passage to a port 81 opening to the inside of the cup through the base of the cup. Nipple 79 and boss 77 have a bore 82 providing a passage to a port 83 opening to the inside of the cup through the base of the cup. Ports 81 and 83 are located at the same distance from the valve axis and are angularly spaced 90°. The extension 73 and the base of the cup have an axial bore 84, and the extension has a counterbore 85 at its outer end. At the inner end of the counterbore 85 is a diametrical groove 86.

The valve V has a valve member generally designated M formed to provide a valve disk 87 rotary in the cup 72. This disk has a stem 88, shown as integral therewith, which extends through the bore 84 and through a tubular screw 89 threaded in the counterbore 85. Packing for the stem in bore 84 is shown at 90. On the outer end of the stem is a knob 91. The screw 89 is shown as extending through a hole in the dashboard D of the vehicle for drawing the end of extension 73 against the dashboard. The screw has an outwardly extending flange 92 engaging a ring 93 and clamping the ring against the dashboard. The stem 88 is axially slidable and rotary in the bore 84 and in the screw 89. A spring 94 is provided in the cup 72 for biasing the valve disk 87 toward engagement with the base of the cup. By pushing in on the knob 91, the disk may be moved axially away from the base of the cup. The disk is provided in the side toward the base of the cup with an annular recess 95. Valve member M includes a sealing ring 96 fixed in this recess 95. The ring 96 projects beyond the face of the disk for engagement with the base of the cup. It has an arcuate slot 97 on a radius corresponding to the radius of ports 81 and 83. The angular extent of this slot corresponds to the angular spacing of ports 81 and 83. The disk 87 and ring 96 have a hole 98 on the radius of the ports 81 and 83 angularly spaced 60° from one end of the slot 97. The disk 87 has an extension 99 projecting toward the cover 74 and adapted to close the port 75 in the cover when the disk is moved away from the base of the cup. Port 75 is a vent port.

Fixed in the stem 88, and located between the inner end of the screw 89 and the inner end of the counterbore 85, is a diametrical pin 100. In the rotary position of the stem 88 in which pin 100 is aligned with the groove 86 at the inner end of the counterbore 85 (see Fig. 11), the rotary position of the disk 87 is such that the hole 98 in the disk and ring 96 is aligned with port 81 in the base of the cup, and the slot 97 is in register with the port 83, otherwise being blocked (see Fig. 12). This position of the disk and stem is referred to as the "manual" position. It is determined by engagement of one end of a peripheral rib 101 on the disk with a stop 102 formed on the interior of the peripheral wall of the cup 72. When the disk is rotated 60° from the stated manual position in counterclockwise direction as viewed in Fig. 12 to the position shown in Fig. 10, the hole 98 moves out of register with port 81, and the arcuate slot 97 comes into position connecting ports 81 and 83. This position of the disk (and stem) is referred to as the "automatic" position. It is determined by engagement of the other end of rib 101 with the stop 102. When the disk and stem are turned to the stated automatic position, pin 100 is moved out of register with the groove 86.

The disk 87 and stem 88 are made of electrical insulation material. On its side toward the cover 74, the disk carries an electrically conductive spring contact member 103 carrying spaced contacts 104 and 105. Fixed in the cover 74 are spaced contacts 106 and 107. These are insulated from the cover as indicated at 108 and have terminals 109 and 110. Contacts 104 and 105 on member 103 are adapted to engage contacts 106 and 107 when, with the disk and stem in manual position, the disk and stem are pushed inward against the bias of spring 94 from their axially outer position.

The vacuum line 61 connects the nipple 60 of the injector unit and the nipple 78 of the valve V. As shown in Fig. 1, a vacuum line 111 is connected between the nipple 79 of valve V and the usual vacuum line 112 of the vehicle leading from the intake manifold of the vehicle to the windshield wiper motor 113 of the vehicle. A signal lamp 114 is provided on the dashboard of the vehicle next to the valve V. A wire 115 extends from the ignition switch 116 of the vehicle to one terminal of the lamp socket. The other terminal of the lamp socket is connected by a wire 117 to one of terminals 109 or 110 on valve V. A wire 118 extends from the other terminal on valve V to the bolt 42, being clamped by the nut 46.

Operation of the above-described system is as follows:

With the valve disk 87 and its stem 88 in the automatic position illustrated in Figs. 9 and 10, the valve disk is held by the spring 94 with the sealing ring 96 against the base of the cup 72, and the slot 97 in the sealing ring provides for communication between the valve passages 80 and 82. When the engine of the vehicle is started, and vacuum is thereby established in the intake manifold of the vehicle and in the vacuum line 112, a vacuum is drawn in the injector motor 49 via line 111, valve passage 82, port 83, slot 97, port 81, valve passage 80, and line 61. Atmospheric pressure on the motor diaphragm 53 thereupon drives the diaphragm and the injector plunger 26 forward (to the right as viewed in Fig. 3) through a pressure stroke against the return bias of springs 68 and 69. Upon such forward movement of the plunger through a pressure stroke from its retracted charging position shown in Fig. 3, lubricant is displaced from within the space in the cylinder 13 ahead of the plunger outward through the inlet port 27 and back to the reservoir R until the plunger reaches a position wherein it blocks off the inlet port and wherein the right edge of plunger groove 33 first encounters the leading (left) edge of the first outlet port 0–1. Then, as the groove 33 crosses port 0–1, the valve ball 39 is open and a charge of lubricant is forced out from the cylinder through the passage 32, the radial plunger ports 41, the groove 33 and the outlet port 0–1 in amount determined by the displacement of the plunger as it moves through the complete distance over which the groove 33 is open to the port 0–1. As the plunger continues its pressure stroke, the right edge of the groove 33 next encounters the leading (left) edge of the next outlet port 0–2, as the left edge of groove 33 is cut off from the preceding port 0–1. Then as the groove 33 crosses port 0–2, a charge of lubricant is forced out of the cylinder through the port 0–2 in amount the same as previously discharged through port 0–1. This action is repeated as the groove 33 crosses the remaining outlet ports 0–3 to 0–12, the plunger moving forward until its forward end engages the head 43 of the bolt 42. Thus, as the plunger is driven through a pressure stroke from its retracted position, equal charges of lubricant are forced out of the cylinder successively through the outlet ports 0–1 to 0–12 one after another, and delivered to the points of lubrication 1 to 12 via delivery lines 1a to 12a.

The plunger 26 remains in its advanced position with its forward end engaging the head 43 of the bolt 42 until the engine of the vehicle is stopped. Thereupon, due to loss of vacuum in the intake manifold, and consequent loss of vacuum in the injector motor M, the springs 68 and 69 return the plunger to its retracted charging position. This enables the injector to be recharged with lubricant for the next operation, lubricant flowing through inlet port 27 into the space in the cylinder ahead of the plunger to fill this space. The next time the engine of the vehicle is started, the operation is repeated, and so on.

For manual operation, the knob 91 of the control valve V is turned to rotate the valve disk 87 to the manual position shown in Figs. 11 and 12, wherein the pin 100 is aligned with the groove 86 so that the knob and valve stem 88 may be pushed inward. Then, the knob 91 may be pushed inward whenever desired to move the disk 87 and the sealing ring 96 axially away from the base of the cup 72. The extension 99 thereupon closes the port 75 in the cover 74. Under these circumstances, vacuum is drawn in the injector motor M via line 111, valve passage 82, port 83, the interior of cup 72, port 81, valve passage 80 and line 61. This operates the injector to deliver charges of lubricant to the respective points of lubrication in the same manner as on automatic operation. Upon pushing in the knob 91, the contact member 103 bridges the contacts 106 and 107. When the plunger 26 engages the head 43 of the bolt 42 at the completion of its pressure stroke, an electrical circuit is completed from the ignition switch 116 via wire 115, signal lamp 114, wire 117, the contact member 103, wire 118, the bolt 42, the plunger 26, the block 14, and the bracket 57 to ground. The signal lamp 114 is thereby energized to indicate to the driver of the vehicle that delivery of lubricant has been completed, and he may then release the knob 91 to allow the valve disk 87 and stem 88 to be returned to the normal retracted position by the spring 94. When this occurs, the extension 99 is withdrawn from the port 75, and the right side of the injector motor diaphragm 53 is subjected to atmospheric pressure via port 75, hole 98, port 81, valve passage 80 and line 61. The plunger 26 is thereupon returned to its retracted position, and the injector is recharged with lubricant. To revert to automatic operation, the knob 91 is rotated to return the valve disk 87 to the automatic position.

During intervals between manual operation, the right side of the injector motor diaphragm 53 is subjected to atmospheric pressure via port 59, line 61, valve passage 80, port 81, hole 98 and port 75, its left side also being subjected to atmospheric pressure. Thus, springs 68 and 69 hold the plunger in retracted position during such intervals. Also, during such intervals, the valve disk 87 blocks the passage 82 so that there is no loss of vacuum from the vacuum line 112. When the valve disk 87 is in the automatic position, the pin 100 prevents the knob 91 from being pushed inward.

It will be understood that other electrical circuit arrangements than that above described may be used, the important feature being that the signal lamp circuit be controlled in response to manual movement of the valve member M to the position for connecting the motor 49 to the manifold of the vehicle engine and completion of a pressure stroke of the injector plunger 26.

Fig. 13 illustrates a second type of reservoir that may be used in connection with the injector. As shown, the reservoir in this case comprises a collapsible tube 120 having a neck 121. Secured to the neck is a tubular screw member 122 having an integral knurled knob 123. Threaded on this knob is a fitting 124. Packing between the fitting and the screw member is indicated at 125. The collapsible tube is supplied pre-loaded with lubricant, and the fitting 124 is threaded into the inlet port 27 of the injector as shown in Fig. 13. It will be understood that these tubes, as supplied pre-loaded with lubricant, will be closed by a cap threaded on the end of the fitting. The tube collapses under external air pressure as lubricant feeds therefrom into the injector.

Fig. 14 illustrates a third type of reservoir which may be used in conjunction with the injector comprising a can 126 having a screw-threaded neck 127 and a screw-threaded cap 128. A rod 129 extends from the cap into the can. The rod is pointed at its lower end as indicated at 130. In using this type of reservoir, the cap together with the rod is removed from the can, and the neck of the can is threaded into the inlet port of the injector as shown in Fig. 15. It will be understood that the lubricant is sufficiently viscous that it will not flow out of the can to any extent in the course of applying the can to the injector. After the can has been applied to the injector as shown in Fig. 15, the bottom of the can, which is now uppermost, is pierced with the pointed end 130 of the rod 129 to provide an air vent in the can, and the rod is left in the can as shown to serve as a dip stick for indicating the level of lubricant in the can. When the supply of lubricant in the can is exhausted, the can is removed and a fresh can applied.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A lubricating system for an automotive vehicle, said vehicle having an engine and an intake manifold in which a vacuum is drawn when the engine is running, comprising an injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, the cylinder being recharged through the inlet port with lubricant from the supply upon movement of the plunger through a return stroke, lubricant lines connecting the outlet ports to said individual points of lubrication on the vehicle, a vacuum-operated motor for operating the plunger, and means for connecting the motor to the manifold including a control valve adapted to be set and to remain in a position for connecting the motor and manifold for automatic operation of the injector in response to starting and stopping the engine, said valve also being adapted for manual operation to connect the motor and manifold and to vent the motor to atmosphere while holding vacuum in the manifold.

2. A lubricating system as set forth in claim 1, further comprising a signal, and means responsive to manual operation of the valve to connect the motor and manifold and completion of a pressure stroke of the plunger for operating the signal.

3. A lubricating system for an automotive vehicle, said vehicle having an engine and an intake manifold in which a vacuum is drawn when the engine is running, comprising an injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, the cylinder being recharged through the inlet port with lubricant from the supply upon movement of the plunger through a return stroke, lubricant lines connecting the outlet ports to said individual points of lubrication on the vehicle, a vacuum-operated motor for operating the plunger, and means for connecting the motor to the manifold including a control valve having a valve member adapted to be set and to remain in a position for connecting the motor and manifold for automatic operation of the injector in response to starting and stopping the engine, said valve member also being adapted to be set for manual operation wherein it normally occupies a retracted position in which it vents the motor to atmosphere while holding vacuum in the manifold, being movable from said retracted position to connect the motor and manifold.

4. A lubricating system as set forth in claim 3, further comprising a signal, and means responsive to movement of said valve member from its said retracted position and completion of a pressure stroke of the plunger for operating the signal.

5. A lubricating system for an automotive vehicle, said vehicle having an engine and an intake manifold in which a vacuum is drawn when the engine is running, comprises an injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, the cylinder being recharged throughout the inlet port with lubricant from the supply upon movement of the plunger through a return stroke, lubricant lines connecting the outlet ports to said individual points of lubrication on the vehicle, a vacuum-operated motor for operating the plunger, and means for connecting the motor to the manifold including a control valve having a rotary and axially movable valve member having a first rotary position for connecting the motor and manifold for automatic operation of the injector in response to starting and stopping the engine, a second rotary position in which it vents the motor to atmosphere while holding vacuum in the manifold, and being axially movable from said second rotary position to a position in which it connects the motor and manifold.

6. A lubricating system as set forth in claim 5, wherein the control valve includes a means for preventing axial movement of the valve member from its first rotary position.

7. A lubricating system as set forth in claim 5, further comprising an electric signal, and a circuit for said signal including circuit control means operable in response to axial movement of the valve member from its said second rotary position and completion of a pressure stroke of the plunger.

8. A lubricating system as set forth in claim 5, wherein the cylinder is electrically conductive and electrically grounded on the vehicle, and has an electrical contact at its forward end, said contact being insulated from the cylinder, the plunger being electrically conductive and in conductive relation to the cylinder, and further comprising an electrical signal connected in a circuit including said contact and further including contact means closed by the valve member upon axial movement thereof from its said second rotary position.

9. A lubricating system for an automotive vehicle, said vehicle having an engine and an intake manifold in which a vacuum is drawn when the engine is running, comprising an injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, the cylinder being recharged through the inlet port with lubricant from the supply upon movement of the plunger through a return stroke, lubricant lines connecting the outlet ports to said individual points of lubrication on the vehicle, a vacuum-operated motor for operating the plunger, means for connecting the motor to the manifold including a control valve adapted for manual operation to connect the motor and manifold and to vent the motor to atmosphere while holding vacuum in the manifold, a signal, and means responsive to manual operation of the valve to connect the motor and manifold and completion of a pressure stroke of the plunger for operating the signal.

10. A lubricating system for an automotive vehicle, said vehicle having an engine and an intake manifold in which a vacuum is drawn when the engine is running, comprising an injector for dispensing measured charges of lubricant from a supply to individual points of lubrication on the vehicle, said injector comprising a cylinder having an inlet port and a series of longitudinally spaced outlet ports and a plunger working in the cylinder and adapted upon movement in one direction through a pressure stroke successively to force out individual charges through the successive outlet ports, the cylinder being recharged through the inlet port with lubricant from the supply upon movement of the plunger through a return stroke, lubricant lines connecting the outlet ports to said individual points of lubrication on the vehicle, a vacuum-operated motor for operating the plunger, and means for connecting the motor to the manifold including a control valve comprising a valve body, a valve member rotary and axially slidable in the valve body, said valve body having a first port connected to the intake manifold, a second port connected to the motor, and a vent port, said valve member having a first rotary position in which it establishes communication between the first and second ports with the vent port open to atmosphere, a second rotary position in which it blocks the first port and establishes communication between the second port and the vent port, and said valve member being axially movable from its said second rotary position to a position in which it blocks the vent port and establishes communication between the first and the second ports.

11. A lubricating system as set forth in claim 10, wherein the control valve includes means for preventing axial movement of the valve member from its said first rotary position.

12. A lubricating system as set forth in claim 10, further comprising a signal, and means responsive to axial movement of the valve member from its said second rotary position and completion of a pressure stroke of the plunger for operating the signal.

13. A lubricating system as set forth in claim 10, further comprising an electric signal, and a circuit for said signal including circuit control means operable in response to axial movement of the valve member from its said second rotary position and completion of a pressure stroke of the plunger.

14. A lubricating system as set forth in claim 10, wherein the cylinder is electrically conductive and electrically grounded on the vehicle, and has an electrical contact at its forward end, said contact being insulated from the cylinder, the plunger being electrically conductive and in conductive relation to the cylinder, and further comprising an electrical signal connected in a circuit including said contact and further including contact means closed by the valve member upon axial movement thereof from its said second rotary position.

15. A lubrication system as set forth in claim 9 wherein said signal is an electrical signal, and wherein said means for operating the signal comprises a circuit including first contact means operable in response to initial actuation of the control valve, and second contact means operable by the plunger when it completes its pressure stroke.

16. A lubrication system as set forth in claim 9 wherein said signal is an electrical signal, and wherein said means for operating the signal comprises a circuit including contact means operable in response to initial actuation of the control valve, and an electrical contact at the forward end of the cylinder, said electrical contact being insulated from the cylinder, the plunger being electrically conductive and in conductive relation to the cylinder, the forward end of the plunger engaging said electrical contact upon completion of the pressure stroke of the plunger.

References Cited in the file of this patent

UNITED STATES PATENTS

| | | |
|---|---|---|
| 1,484,643 | Hansen | Feb. 26, 1924 |
| 2,360,093 | Ainslie | Oct. 10, 1944 |
| 2,498,407 | Fine | Feb. 21, 1950 |
| 2,556,780 | Shryrock | June 12, 1951 |
| 2,675,097 | Dorsey | Apr. 13, 1954 |
| 2,686,476 | Klein | Aug. 17, 1954 |